United States Patent Office 3,528,551
Patented Sept. 15, 1970

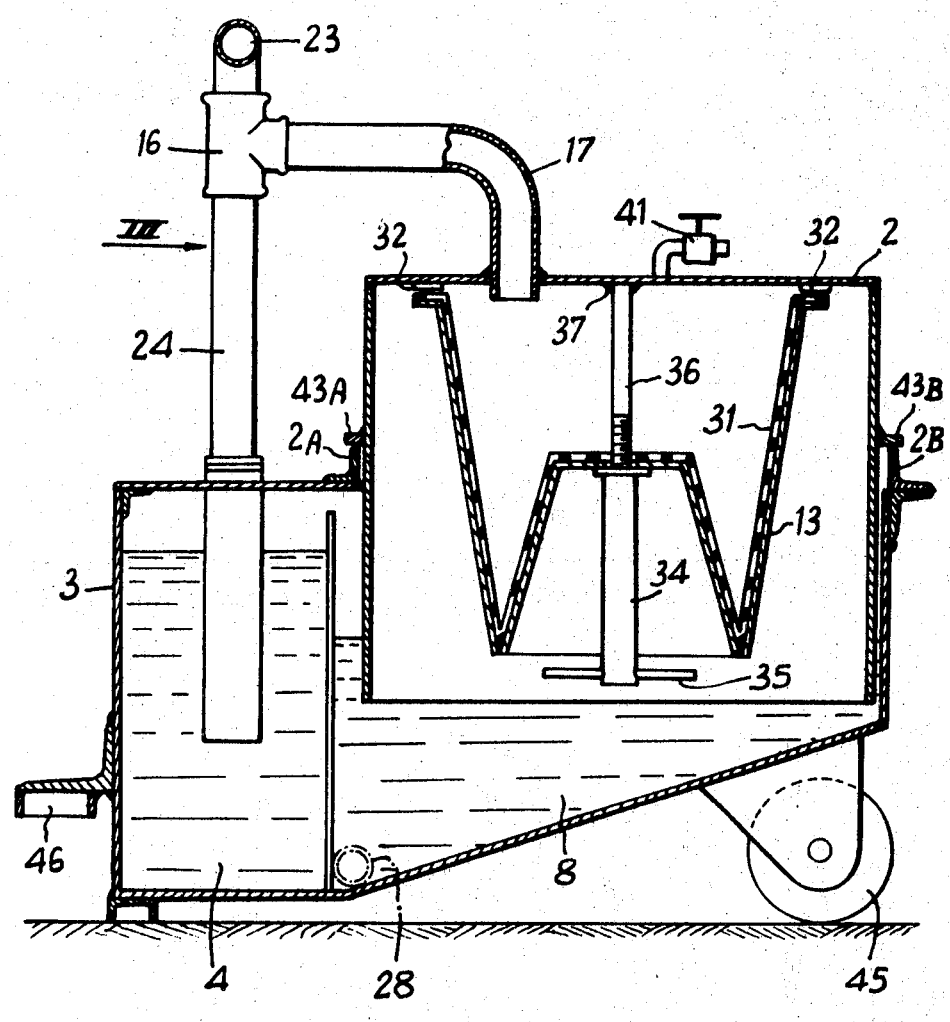

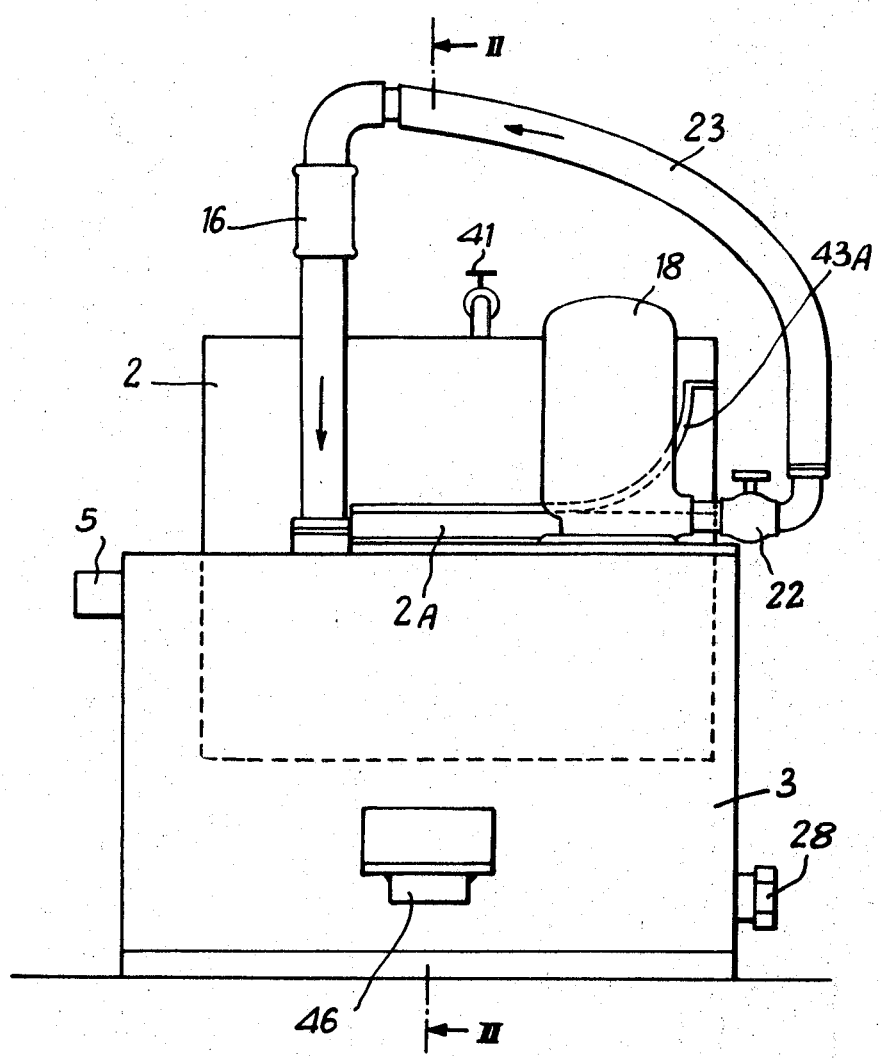

3,528,551
FILTERING INSTALLATION, MORE PARTICULARLY FOR CUTTING TOOL COOLING LIQUIDS
Jean Frederic Herubel, Guebwiller, France, assignor to N. Schlumberger & Cie, Guebwiller, France, a French company
Filed May 14, 1968, Ser. No. 729,042
Claims priority, application France, May 30, 1967, 108,411
Int. Cl. B01d 35/26
U.S. Cl. 210—196     4 Claims

ABSTRACT OF THE DISCLOSURE

The installation comprises a first tank where the liquid to be filtered is poured and in which is suspended a bell supporting the filtering element and whose upper part is connected to a sucking device, such as a water jet injector for example, using a pump which works in closed circuit with a second tank into which the sucking device pours the filtered liquid which it has taken from the top of the bell.

---

The present invention relates to filtering installations and more especially installations for filtering cutting and grinding tool cooling liquids, and it has in view the installations of the type in which the liquid to be filtered traverses upwardly a filtering porous wall.

This arrangement has the advantage of allowing, for the polluted liquid, a prior decantation in the course of which the heaviest foreign particles settle of their own accord and do not impede the operation of the filter whose work is limited to the retention of the finest particles.

However, in the known installations of this type the liquid to be filtered is forced through the filter, which has a certain number of disadvantages. Indeed, this necessitates sealing means which raise a number of problems, more especially as one must be able to have easy and rapid access to the filtering element to effect its replacement or merely its cleaning. The passage of the liquid to be filtered through a pump brings about a vigorous stirring of this liquid, which is detrimental to its process of prior decantation before passing into the filter. Finally, the more or less abrasive particles in suspension in the liquid damage the pump which forces this latter through the filter.

The aim of the invention is to provide a filtering installation of the type in question, which does not have the aforesaid disadvantages of the conventional installations.

To this end, in accordance with the invention the installation comprises a first tank into which the liquid to be filtered is poured and in which is suspended a bell supporting the filtering element and whose upper part is connected to a sucking device, such as a water jet injector for example, using a pump which works in closed circuit with a second tank into which the sucking device pours the filtered liquid which it has taken from the top of the bell.

By virtue of this new conception, the sealing problems are largely simplified, since it is sufficient that the bell dips into the liquid of the tank for its tightness to be automatically brought about by the hydraulic seal formed by its edge immersed in the liquid. Moreover, to clean or remove the filter it is sufficient to raise the bell, an operation which can be carried out very easily since this latter can simply rest upon the edges of the tank, without any fixing, nor above all without the need for any seals. In addition, the liquid to be filtered does not undergo any stirring in the tank before its passage into the filter, since it is not delivered by a pump, but finds itself in the stagnant state in the tank. Finally, the pump puts a liquid into circulation which is already filtered and which, consequently, no longer comprises abrasive particles likely to damage the pump.

The invention will be better understood by reading the following description and by examining the attached drawing which show, merely by way of example and in no way restrictive, one embodiment of a filtering installation for sprinkling liquids for cutting or grinding tools in accordance with the invention.

In the drawing:

FIG. 2 is, on a larger scale, a vertical section of the main part of the installation of FIG. 1, taken along the line II—II of FIG. 3, and FIG. 3 is a profile view observed in the direction of the arrow III in FIG. 2.

Figure 1:
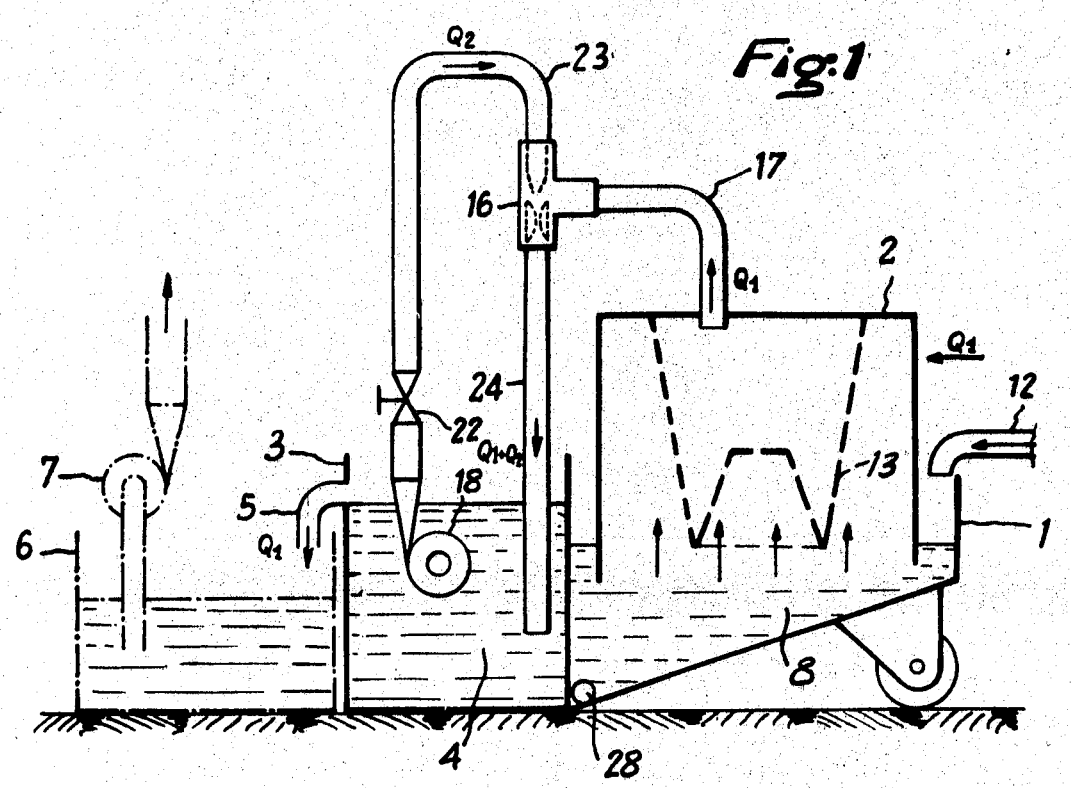
FIG. 1 shows diagrammatically the entire installation.

The installation for filtering cutting or grinding tool cooling liquid shown in FIG. 1 comprises a first tank 1 in which is suspended a bell 2 and a second tank 3 from where the filtered liquid 4 flows, through an overflow 5, into a trough 6 where it is taken up, for example by a pump 7, to be forced towards a user machine-tool.

The liquid to be filtered 8 pours into the first tank 1, for example through a duct 12.

Fixed by its edge in the bottom of the bell 2 there is a filtering element 13, preferably biconic.

A sucking device 16, constituted preferably by a water jet injector, is connected by a duct 17 to the top of the bell 2 and it is put into action by a pump 18, for example a centrifugal pump immersed in the second tank 4, and whose discharge port is connected, through the medium of a regulating cock 22, to a flexible hose 23 opening into the entrance to the water jet injector 16 whose outlet is connected, by another duct 24, to the same tank 4.

The operation of the installation is as follows:

Let us assume, to begin with, that the installation is in the state of rest and that atmospheric pressure prevails in its various parts. The pump 18 is started up as soon as a discharge Q1 of liquid to be filtered flows into the first tank 1. This pump forces a discharge Q2 of power liquid into the water jet injector 16 which initially sucks in the air contained in the bell 2 and afterwards some liquid which has traversed the filtering element 13 upwardly. In the second tank 4 there is therefore delivered the discharge Q2 of filtered liquid increased by the discharge Q1 of filtered liquid taken from the top of the bell. When steady working is established, a quantity Q1 of filtered liquid flows, through the overflow 5, into the trough 6 which constitutes a reserve from where it can be sucked, according to requirements by the pump 7.

By means of the cock 22 the discharge Q2 of the pump 18 can be adjusted to produce the desired vacuum in the water jet injector 16 with a view to sucking the necessary discharge of liquid to be filtered. The stability of the level of the liquid in the first tank 1 characterises the state of steady working.

In the first tank 1, the liquid to be filtered initially undergoes a decantation in the course of which the heaviest particles fall, while the filtering wall 13 retains all the other particles. On this filtering wall a porous layer forms which perceptibly increases the efficiency of the filtering.

In an installation of this type in service it has been established that the filtering threshold was below 5 microns and that a fairly large percentage of particles of the order of one micron was retained by the filtering element.

When the pump 18 has been stopped, no liquid any longer traverses the filter and the cake of solid particles which this latter had retained falls of its own accord through gravity into the bottom of the tank 1.

A drain orifice 28 placed at the lower point of the inclined bottom of the first tank 1 facilitates removal of the impurities.

By way of modification, one could obviously draw the filtered liquid directly from the second tank 4, instead of letting it flow over into an adjacent trough 6.

The main part of the filtering installation of FIG. 1 has been shown in a less diagrammatic manner in FIGS. 2 and 3. In FIGS. 2 and 3, the same members have been denoted by the same reference numerals. In addition, it has simply been shown, by way of example, that the filtering element 13 which is, for example, made of felt or of "nylon," is supported by a basket 31 of foraminated sheet, obviously of a corresponding biconic shape in this example. The edge of the basket 31 is applied against the bottom of the bell through the medium of an annular seal 32 made of rubber, under the action of a tightening sleeve 34 provided with a handle 35 and screwed onto the lower part of an axial tie-rod 36 whose upper end is secured, for example by welding, as shown as 37, in the bottom of the bell 2.

The bottom of the bell 2 is provided with a cock 41 by means of which one can on occasion restore the atmospheric pressure inside the bell, before raising this latter to clean or replace the filtering element.

In this example the bell 2 is of a parallepipedic shape with a square base and it is supported on two opposed edges 2A and 2B of the tank 1 of corresponding substantially square section by means of two corresponding bosses 43A and 43B welded onto the two corresponding opposed lateral walls of the said bell.

For the convenience of this operation the bosses 43A, 43B can be given a shape comprising a rounded portion, as shown in FIG. 3, which allows the bell to be rocked conveniently.

In the embodiment shown, the bottom of the first tank 1 is provided with two casters, such as 45, while the front face of the second tank 3 carries, in the vicinity of its lower part, a hollow boss 46 in which one can engage the ball of a castered arm of any appropriate conventional type, which allows the installation to be shifted very conveniently.

The invention is, of course, not restricted to the embodiment described and shown, and it goes without saying that modifications can be made thereto without, however, departing from the scope of the invention.

Thus, for example, instead of the water jet injector one could use, sucking means, other equivalent devices, such as, for example, a self-priming pump with liquid ring.

Furthermore, the invention is applicable to the filtering of other liquids than liquids for cooling cutting and grinding tools, and for example to the purification of oils or of various solutions.

Finally, this system of filtering can be improved, either by a modification of the tanks, or by the adding of means for automatic scrapping and for automatic drain; it will then be utilizable in manufacturing operations to separate a solid phase from a liquid phase.

What I claim is:

1. A filtering plant comprising, in combination, a first tank into which liquid to be filtered is poured; a bell-like member having a substantially closed end, lateral walls and an open end, said open end being directed downwardly into the liquid in said first tank with the part of said lateral walls adjacent said open end being immersed in the liquid to form a liquid seal for said open end; support means supporting said bell-member; porous wall means defining an inverted bell, arranged within said bell-like member and having the edge of its open end engaged with the closed end of said bell-like member; securing means extending axially of said inverted bell and securing said inverted bell to the closed end of said bell-like member in sealed relation; sucking means communicating with the interior of said inverted bell to draw liquid from said first tank through said porous wall means; and a second tank into which said sucking means discharges filtered liquid which is passed through said porous wall means.

2. A filtering plant according to claim 1, wherein said porous wall means comprises a frusto-conical member having a frusto-conical reentrant portion.

3. A filtering plant according to claim 1, wherein said bell-like member is of a general parallelepipedic shape with a square base and lateral faces, and has on two opposite lateral faces, two bosses, said first tank having lateral walls with upper edges and said bosses resting upon said upper edges of said first tank.

4. A filtering plant according to claim 1, wherein said sucking means comprises a liquid jet injector and a pump which draws liquid from said second tank and discharges it, as a motive fluid, into said liquid jet injector; a pipe connecting said injector to the interior of said inverted bell for aspiration of filtered liquid in said inverted bell into said injector; and a pipe connected to the discharge end of said jet injector and discharging filtered liquid below the level of filtered liquid in said second tank; whereby said pump and said liquid jet injector constitute a closed liquid flow circuit relative to the filtered liquid in said second tank.

References Cited
UNITED STATES PATENTS

| | | | |
|---|---|---|---|
| 1,454,113 | 5/1923 | Hamilton et al. | 210—257 |
| 2,381,760 | 8/1945 | Latham | 210—195 X |
| 2,580,209 | 12/1951 | Wiley | 210—311 X |
| 2,860,785 | 11/1958 | Gardner | 210—195 |
| 3,327,856 | 6/1967 | Beduhn | 210—262 X |
| 3,404,781 | 10/1968 | Andre | 210—261 X |

JOHN W. ADEE, Primary Examiner

U.S. Cl. X.R.
210—257, 258, 416